United States Patent
Jarvinen et al.

(10) Patent No.: US 9,779,093 B2
(45) Date of Patent: Oct. 3, 2017

(54) SPATIAL SEEKING IN MEDIA FILES

(71) Applicant: Nokia Technologies Oy, Espoo (FI)

(72) Inventors: Roope Olavi Jarvinen, Lempaala (FI); Miikka Vilermo, Siuro (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/719,863

(22) Filed: Dec. 19, 2012

(65) Prior Publication Data

US 2014/0169754 A1    Jun. 19, 2014

(51) Int. Cl.
| | | |
|---|---|---|
| H04N 7/025 | (2006.01) | |
| G06F 17/30 | (2006.01) | |
| H04N 5/76 | (2006.01) | |
| H04N 9/806 | (2006.01) | |
| G11B 27/10 | (2006.01) | |
| G11B 27/28 | (2006.01) | |
| G11B 27/34 | (2006.01) | |

(52) U.S. Cl.
CPC ...... *G06F 17/30026* (2013.01); *G11B 27/105* (2013.01); *G11B 27/28* (2013.01); *G11B 27/34* (2013.01); *H04N 5/76* (2013.01); *H04N 9/806* (2013.01)

(58) Field of Classification Search
None
See application file for complete search history.

(56) References Cited

U.S. PATENT DOCUMENTS 5,686,957 A * 11/1997 Baker ............................. 348/36
2002/0147782 A1 * 10/2002 Dimitrova .............. H04N 7/163
709/207

(Continued)

FOREIGN PATENT DOCUMENTS

WO    WO 2012/087481 A1    6/2012

OTHER PUBLICATIONS

Davis, Marc; "Media Streams: An Iconic Visual Language for Video Representation"; Downloaded at http://courses.ischool.berkeley.edu/i202/f01/assignments/media-streams.pdf on Jan. 17, 2013.

(Continued)

*Primary Examiner* — Hung Dang
*Assistant Examiner* — Sunghyoun Park
(74) *Attorney, Agent, or Firm* — Alston & Bird LLP

(57) ABSTRACT

A method, apparatus, and computer program product are provided in order to playback video and/or audio files wherein a desired segment is selected and played back based on its spatial audio content. In the context of a method, playback of media data is provided. The method may include generating one or more spatial seek points for the media data and causing display of information corresponding to the one or more spatial seek points. The method may further include performing the generation of the one or more seek points based on receiving a request for spatial seek points, automatically upon receiving the media data or upon starting playback of the media data, or based on the format of the media data. The method may further include receiving a selection of one of the one or more spatial seek points and providing for playback of the media data from a time point corresponding to the selected spatial seek point. A corresponding apparatus and a computer program product are also provided.

20 Claims, 5 Drawing Sheets

(56) References Cited

U.S. PATENT DOCUMENTS

| | | | |
|---|---|---|---|
| 2003/0072456 A1* | 4/2003 | Graumann | G01S 5/18 381/66 |
| 2003/0140083 A1* | 7/2003 | Watkins | H04L 29/06 718/102 |
| 2003/0220971 A1* | 11/2003 | Kressin | H04L 12/1822 709/204 |
| 2004/0027365 A1 | 2/2004 | Sayers et al. | |
| 2006/0051064 A1* | 3/2006 | Bray | G11B 27/034 386/261 |
| 2006/0075422 A1* | 4/2006 | Choi | G01S 3/7864 725/18 |
| 2006/0284881 A1* | 12/2006 | Suzuki | G09G 5/005 345/589 |
| 2006/0288273 A1* | 12/2006 | Erol et al. | 715/512 |
| 2008/0046406 A1* | 2/2008 | Seide | G06F 17/30743 |
| 2008/0256394 A1 | 10/2008 | Rashevsky et al. | |
| 2009/0089056 A1* | 4/2009 | Fujii | 704/246 |
| 2009/0103886 A1* | 4/2009 | Kataoka | G11B 27/034 386/248 |
| 2010/0138411 A1* | 6/2010 | Judy et al. | 707/723 |
| 2010/0241962 A1* | 9/2010 | Peterson et al. | 715/720 |
| 2011/0035669 A1 | 2/2011 | Shirali et al. | |
| 2011/0040754 A1* | 2/2011 | Peto | G06F 17/218 707/736 |
| 2011/0283865 A1* | 11/2011 | Collins | G06F 3/04817 84/464 R |
| 2014/0376728 A1* | 12/2014 | Ramo | G06T 19/006 381/56 |

OTHER PUBLICATIONS

Pongnumkul, Suporn, et al.; "Content-Aware Dynamic Timeline for Video Browsing" Downloaded at http://research.microsoft.com/en-us/um/people/cohen/tn240-pongnumkul.pdf on Jan. 17, 2013.

Dehaan, Peter, et al.; "Using Adobe Media Encoder CS5"; Downloaded from http://www.adobe.com/devnet/flash/quickstart/video_encoder.html on Jan. 23, 2013.

* cited by examiner

SPATIAL SEEKING IN MEDIA FILES

TECHNOLOGICAL FIELD

An example embodiment of the present invention relates generally to audio/video playback and, more particularly, wherein a desired segment is selected based on its spatial audio content.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The modern communications era has brought about a tremendous expansion of wireline and wireless networks. Wireless and mobile networking technologies have addressed related consumer demands, while providing more flexibility and immediacy of information transfer. Concurrent with the expansion of networking technologies, an expansion in computing power has resulted in the development of affordable computing devices capable of taking advantage of services made possible by modern networking technologies. This expansion in computing power has led to a reduction in the size of computing devices and given rise to a new generation of mobile devices that are capable of performing functionality that only a few years ago required processing power that could be provided only by the most advanced desktop computers. Consequently, mobile computing devices having a small form factor have become ubiquitous and are used to access network applications and services by consumers of most all socioeconomic backgrounds.

Many computing devices, such as mobile terminals, e.g., media players, cellular telephones, smart phones, tablet computers or the like, capture, store, or otherwise have the access to a plurality of video and audio files. When playing back a video or audio file on such a device, a user may wish to move to a certain point in time of the video or audio playback. Some methods of seeking a particular segment in a video or audio include jumping back and forth in the video/audio stream be a certain fixed amount of time or seeking the next scene change or I-frame in an encoded video clip. However, such methods of seeking a certain point in a video or audio stream may be problematic. For example, a user may not remember at which point a particular event occurred and may have to search through significant parts of the stream to find that particular point of time.

BRIEF SUMMARY

Embodiments of the present invention relate to spatial audio and utilizing spatial audio characteristics in a user interface of a device. Many electronic devices are capable of capturing video and including at least stereo audio in the same clip. Audio capturing capabilities of devices may also include multi-channel recording using microphone arrays, which again can be used to detect the direction of incoming audio signals.

A method, apparatus and computer program product are therefore provided according to an example embodiment of the present invention in order to playback video and/or audio files wherein a desired segment is selected and played back based on its spatial audio content.

In one embodiment, a method is provided that at least includes providing for playback of media data; generating, by the processor, one or more spatial seek points for the media data; and causing display of information corresponding to the one or more spatial seek points to be provided to a user interface.

In some embodiments, the method may further comprise generating the one or more spatial seek points for the media data upon receiving a request for spatial seek points, automatically upon receiving the media data or upon starting playback of the media data, or based on the type or format of the media data.

In some embodiments, the method may further comprise receiving a selection of one of the one or more spatial seek points and providing for playback of the media data from a time point corresponding to the selected spatial seek point.

In some embodiments, the method may further comprise causing storing of the information corresponding to the one or more spatial seek points for later use. In some embodiments, the method may further comprise determining spatial audio characteristics of the media data for use in generating the one or more spatial seek points for the media data.

In some embodiments, the spatial seek points correspond to a direction of a source of audio in the media file. In some embodiments, the request for spatial seek points in the media data comprises a requested location for spatial audio events in the media file.

In some embodiments, causing display of information corresponding to the one or more spatial seek points comprises indicating start points of segments corresponding to spatial audio events from a requested location. In some embodiments, causing display of information further comprises causing display of a timeline indicating the spatial seek points and a thumbnail picture of a corresponding video segment for each of the spatial seek points on the timeline.

In some embodiments, the method may further comprise receiving a request for additional spatial seek points and generating a second set of one or more spatial seek points for the media data for the requested spatial audio location.

In another embodiment, a method is provided that at least includes providing for playback of media data; receiving, by a processor, a request for spatial seek points in the media data; determining spatial audio characteristics of the media data; generating, by the processor, one or more spatial seek points for the media data based in part on the spatial audio characteristics; and causing display of information corresponding to the one or more spatial seek points to be provided to a user interface.

In another embodiment, a method is provided that at least includes receiving media data, determining spatial audio characteristics of the media data, generating one or more spatial seek points for the media data based in part on the spatial audio characteristics, and causing storage of information corresponding to the one or more spatial seek points.

In another embodiment, an apparatus is provided that includes at least one processor and at least one memory including computer program instructions with the at least one memory and the computer program instructions configured to, with the at least one processor, cause the apparatus at least to provide for playback of media data; generate one or more spatial seek points for the media data; and cause display of information corresponding to the one or more spatial seek points to be provided to a user interface.

In some embodiments, the at least one memory and the computer program instructions may be further configured to, with the at least one processor, cause the apparatus at least to generate the one or more spatial seek points for the media data upon receiving a request for spatial seek points, automatically upon receiving the media data or upon starting playback of the media data, or based on the type or format of the media data.

In some embodiments, the at least one memory and the computer program instructions may be further configured to, with the at least one processor, cause the apparatus at least to receive a selection of one of the one or more spatial seek points; and provide for playback of the media data from the point corresponding to the spatial seek point.

In some embodiments, the at least one memory and the computer program instructions may be further configured to, with the at least one processor, cause the apparatus at least to store the information corresponding to the one or more spatial seek points for later use. In some embodiments, the at least one memory and the computer program instructions may be further configured to, with the at least one processor, cause the apparatus at least to determine spatial audio characteristics of the media data for use in generating the one or more spatial seek points for the media data.

In some embodiments, causing display of information corresponding to the one or more spatial seek points comprises the at least one memory and the computer program instructions may be further configured to, with the at least one processor, cause the apparatus at least to indicate start points of segments corresponding to spatial audio events from a requested location or cause display of a timeline indicating the spatial seek points and a thumbnail picture of a corresponding video segment for each of the spatial seek points on the timeline.

In some embodiments, causing display of information corresponding to the one or more spatial seek points comprises the at least one memory and the computer program instructions may be further configured to, with the at least one processor, cause the apparatus at least to In some embodiments, the at least one memory and the computer program instructions may be further configured to, with the at least one processor, cause the apparatus at least to receive a request for additional spatial seek points and generate a second set of one or more spatial seek points for the media data for the requested spatial audio location.

In another embodiment, an apparatus is provided that includes at least one processor and at least one memory including computer program instructions with the at least one memory and the computer program instructions configured to, with the at least one processor, cause the apparatus at least to receive media data; generate one or more spatial seek points for the media data; and cause storage of information corresponding to the one or more spatial seek points.

In a further embodiment, a computer program product is provided that includes at least one non-transitory computer-readable storage medium bearing computer program instructions embodied therein for use with a computer with the computer program instructions including program instructions configured to provide for playback of media data; generate one or more spatial seek points for the media data; and cause display of information corresponding to the one or more spatial seek points to be provided to a user interface.

In some embodiments, the program instructions may be further configured to generate the one or more spatial seek points for the media data upon receiving a request for spatial seek points, automatically upon receiving the media data or upon starting playback of the media data, or based on the type or format of the media data.

In some embodiments, the program instructions may be further configured to receive a selection of one of the one or more spatial seek points; and provide for playback of the media data from the point corresponding to the spatial seek point.

In some embodiments, the program instructions may be further configured to cause storing of the information corresponding to the one or more spatial seek points for later use. In some embodiments, the program instructions may be further configured to determine spatial audio characteristics of the media data for use in generating the one or more spatial seek points for the media data.

In some embodiments, causing display of information corresponding to the one or more spatial seek points comprises the program instructions being further configured to indicate start points of segments corresponding to spatial audio events from a requested location.

In some embodiments, causing display of information corresponding to the one or more spatial seek points comprises the program instructions being further configured to cause display of a timeline indicating the spatial seek points and a thumbnail picture of a corresponding video segment for each of the spatial seek points on the timeline.

In some embodiments, the program instructions may be further configured to receive a request for additional spatial seek points; and generate a second set of one or more spatial seek points for the media data for the requested spatial audio location.

In a further embodiment, a computer program product is provided that includes at least one non-transitory computer-readable storage medium bearing computer program instructions embodied therein for use with a computer with the computer program instructions including program instructions configured to receive media data; generate one or more spatial seek points for the media data; and cause storage of information corresponding to the one or more spatial seek points.

In another embodiment, an apparatus is provided that includes at least means for providing for playback of media data, means for generating one or more spatial seek points for the media data, and means for causing display of information corresponding to the one or more spatial seek points to be provided to a user interface.

In some embodiments, the apparatus may further comprise means for generating the one or more spatial seek points for the media data upon receiving a request for spatial seek points, automatically upon receiving the media data or upon starting playback of the media data, or based on the type or format of the media data In some embodiments, the apparatus may further comprise means for receiving a selection of one of the one or more spatial seek points and means for providing for playback of the media data from a time point corresponding to the selected spatial seek point.

In some embodiments, the apparatus may further comprise means for causing storing of the information corresponding to the one or more spatial seek points for later use. In some embodiments, the apparatus may further comprise means for determining spatial audio characteristics of the media data for use in generating the one or more spatial seek points for the media data.

In some embodiments, the means for causing display of information corresponding to the one or more spatial seek points comprises means for indicating start points of segments corresponding to spatial audio events from a requested location.

In some embodiments, the means for causing display of information further comprises means for causing display of a timeline indicating the spatial seek points and a thumbnail picture of a corresponding video segment for each of the spatial seek points on the timeline.

In some embodiments, the apparatus may further comprise means for receiving a request for additional spatial seek points and means for generating a second set of one or more spatial seek points for the media data for the requested spatial audio location.

In another embodiment, an apparatus is provided that at least includes means for receiving media data, means for generating one or more spatial seek points for the media data, and means for causing storage of information corresponding to the one or more spatial seek points.

BRIEF DESCRIPTION OF THE DRAWINGS

Figure 1:
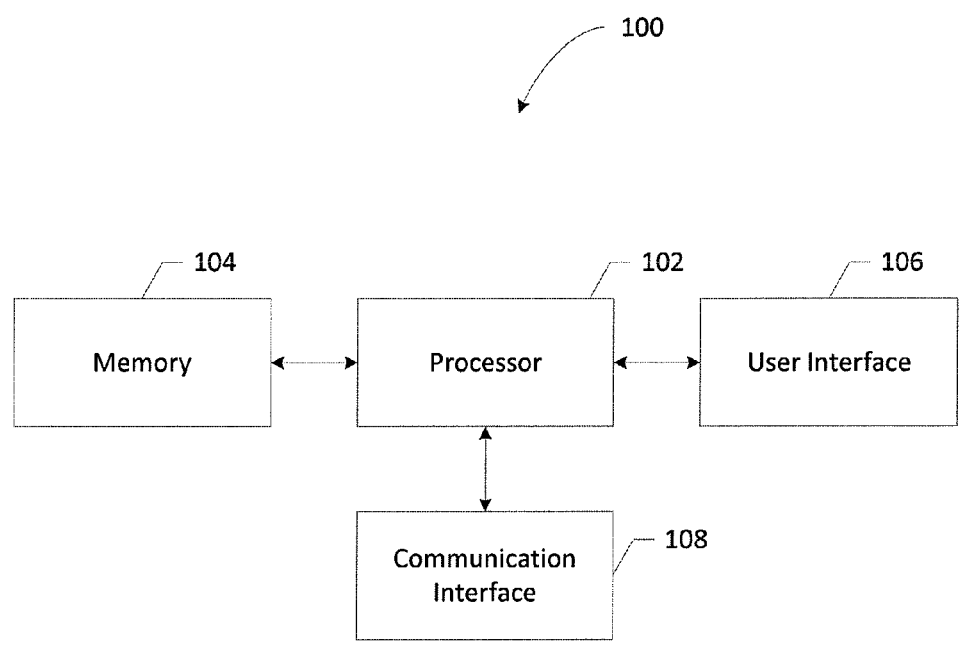
Figure 2:
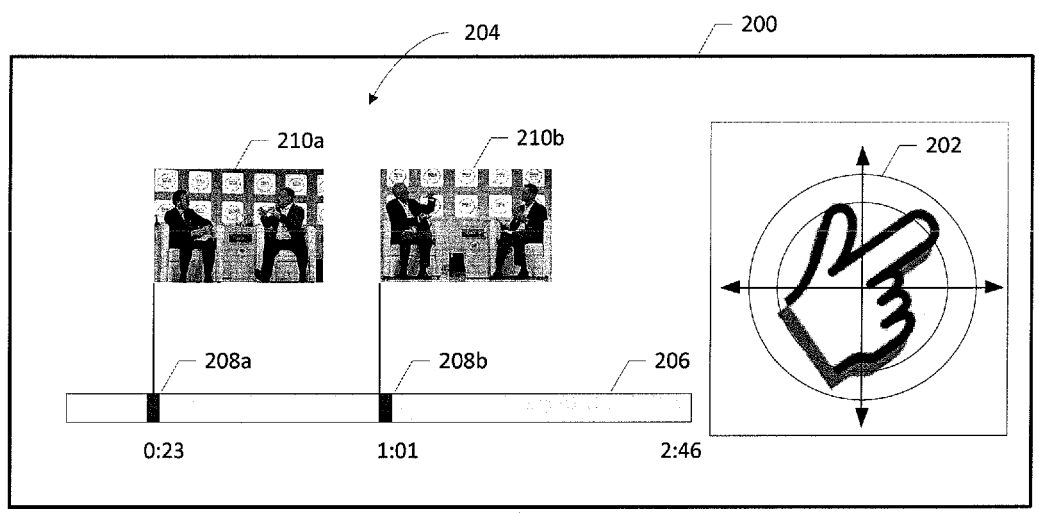
Figure 3:
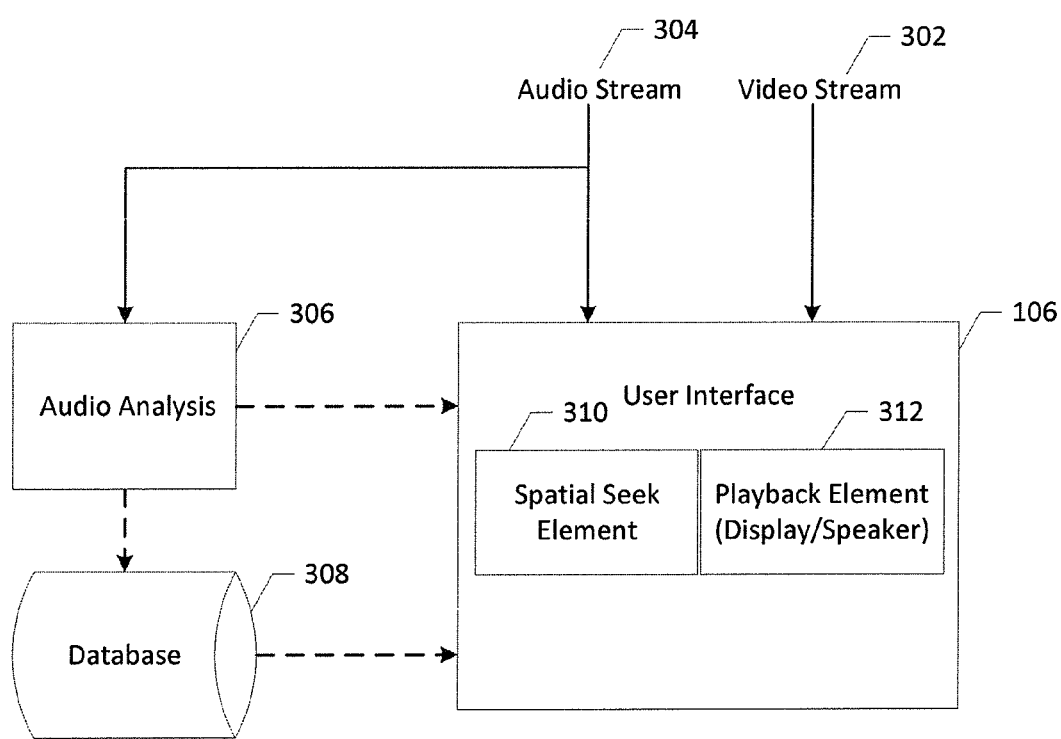
Figure 4:
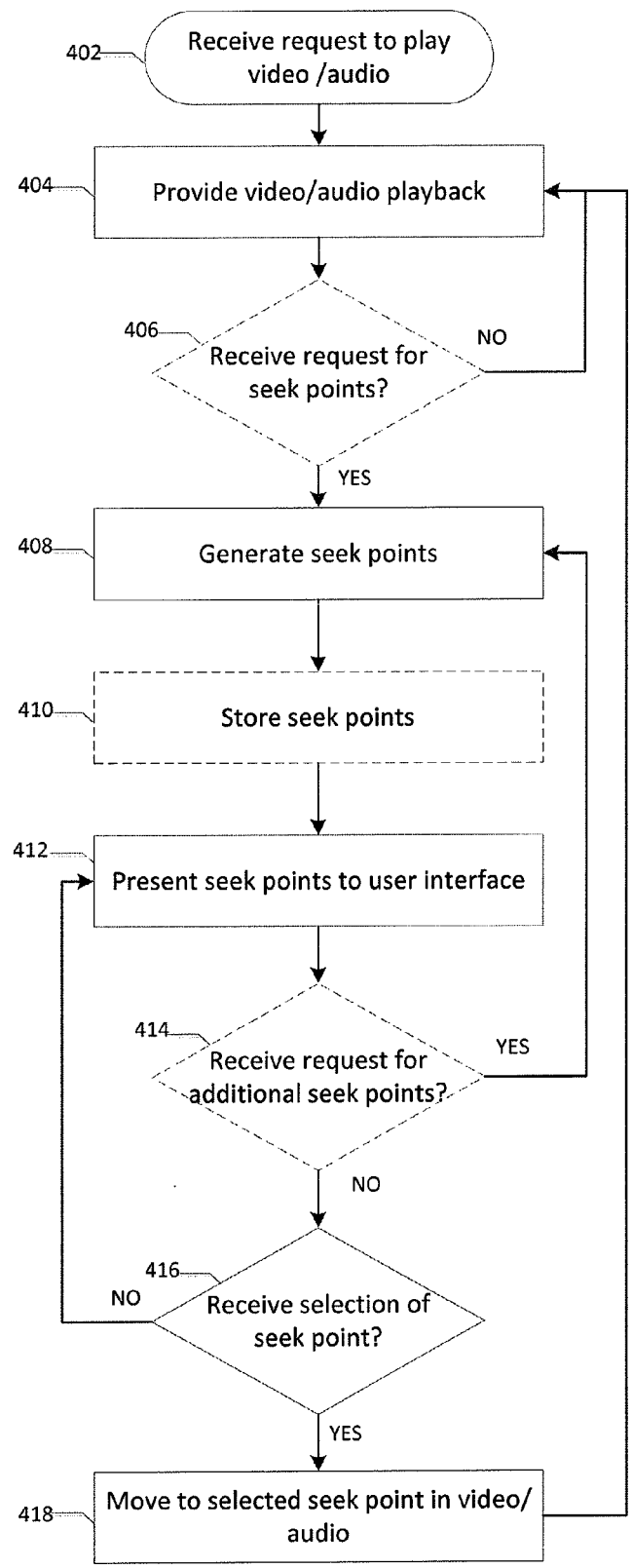
Figure 5:
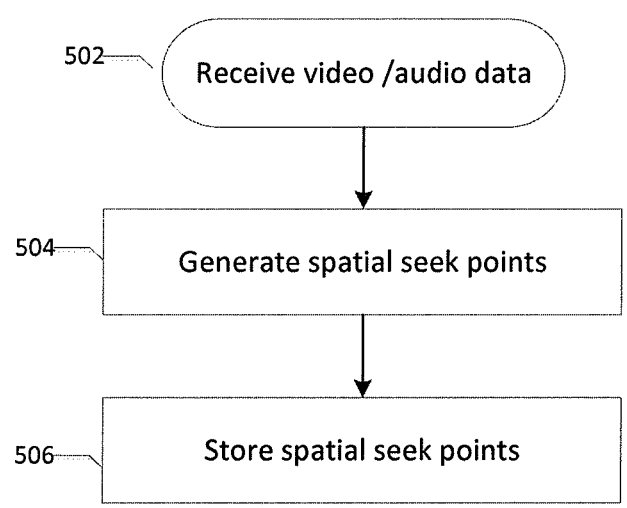

Having thus described certain embodiments of the invention in general terms, reference will now be made to the accompanying drawings, which are not necessarily drawn to scale, and wherein:

FIG. 1 is a block diagram of an apparatus that may be specifically configured in accordance with an example embodiment of the present invention;

FIG. 2 is an illustration of user interface components that may be provided in accordance with an example embodiment of the present invention;

FIG. 3 is a block diagram of components that may be included in an apparatus to provide operations in accordance with an example embodiment of the present invention;

FIG. 4 is a flow chart illustrating operations for spatial seeking performed by an apparatus in accordance with an example embodiment of the present invention; and FIG. 5 is a flow chart illustrating operations for spatial seeking performed by an apparatus in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

Seeking a certain point of time in a video or audio file may be problematic due to various reasons. For example, in a long video clip the user may find it hard to remember at which point of time the event he is looking for happened even if the clip was recorded by the user. However, a user may remember what kind of auditory events took place during the recording or the video clip the user is watching may contain a scene where the sources of auditory events may be intuitively pinpointed. In these cases it would be beneficial if there was a method to perform seeking in a media file based on spatial audio events.

Embodiments of the present invention relate to spatial audio and utilizing spatial audio characteristics in a user interface of a device. Many electronic devices are capable of capturing video and including at least stereo audio in the same media file. Audio capturing capabilities of devices may also include multi-channel recording using microphone arrays, which again can be used to detect the direction of incoming audio signals. Embodiments of the present invention provide for video and/or audio file playback wherein a desired segment for playback may be selected based on its spatial audio content.

Some example embodiments provide a user interface element that may use spatial audio information included in a video and/or audio file to enable spatial seeking, i.e. generating seek points for the video and/or audio file corresponding to points of time in the video and/or audio stream which include audio coming from a certain direction.

The system of an embodiment of the present invention may include an apparatus 100 as generally described below in conjunction with FIG. 1 for performing one or more of the operations set forth by FIGS. 4 and 5 and also described below.

It should also be noted that while FIG. 1 illustrates one example of a configuration of an apparatus 100 for providing playback of video and/or audio and providing spatial seeking for video and/or audio, numerous other configurations may also be used to implement other embodiments of the present invention. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

Referring now to FIG. 1, an apparatus 100 for providing spatial seeking for video and/or audio in accordance with one example embodiment may include or otherwise be in communication with one or more of a processor 102, a memory 104, a user interface 106, and a communication interface 108.

In some embodiments, the processor (and/or co-processors or any other processing circuitry assisting or otherwise associated with the processor) may be in communication with the memory 104 via a bus for passing information among components of the apparatus. The memory device 104 may include, for example, a non-transitory memory, such as one or more volatile and/or non-volatile memories. In other words, for example, the memory 104 may be an electronic storage device (e.g., a computer readable storage medium) comprising gates configured to store data (e.g., bits) that may be retrievable by a machine (e.g., a computing device like the processor). The memory 104 may be configured to store information, data, content, applications, instructions, or the like for enabling the apparatus to carry out various functions in accordance with an example embodiment of the present invention. For example, the memory 104 could be configured to buffer input data for processing by the processor 102. Additionally or alternatively, the memory 104 could be configured to store instructions for execution by the processor.

In some embodiments, the apparatus 100 may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 102 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 102 may be configured to execute instructions stored in the memory 104 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 100 may include a user interface 106 that may, in turn, be in communication with the processor 102 to provide output to the user and, in some embodiments, to receive an indication of a user input. For example, the user interface may include a display and, in some embodiments, may also include a keyboard, a mouse, a joystick, a touch screen, touch areas, soft keys, a microphone, a speaker, or other input/output mechanisms. The processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory 104, and/or the like).

Meanwhile, the communication interface 108 may be any means such as a device or circuitry embodied in either hardware or a combination of hardware and software that is configured to receive and/or transmit data from/to a network and/or any other device or module in communication with the apparatus 100. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

FIG. 2 illustrates example user interface elements that may be provided in some embodiments to facilitate spatial seeking in video and/or audio files.

A user interface of some example embodiments, such as user interface 106 of apparatus 100, may comprise elements to allow a user to indicate a desired audio direction for seeking in a video and/or audio file as well as provide for display of the spatial seek points generated as a result of the user indication.

In an example embodiment, a user may launch playback of a video and/or audio file on a device, such as apparatus 100. While the device is playing back the selected video and/or audio file, a user may indicate, such as through user interface 106, that the user is interested in seeking particular segments within the video and/or audio stream.

In some example embodiments, the user interface may include an intuitive input element through which a user may indicate a spatial location for the spatial seek operations. For example, user interface 106 may provide an interface element, such as spatial seeking control 202 to receive input of the desired spatial location (e.g. audio source direction). The spatial seeking control 202 illustrates a compass-like interface representing a 360-degree circle around the viewpoint as one example of a spatial seeking control interface. A user may select any direction on the circle to request generation of spatial seek points corresponding to that direction. The spatial seeking control may be constantly visible during playback of the video and/or audio file or it may be provided for display only upon receiving a request from the user, such as where device size may limit the available space for display of a user interface control element.

In some example embodiments, the user interface may provide for display of information about the spatial seek points generated based on the user request, such as seek information element 204.

For example, a user may be viewing playback of a video file of compilations of interviews between two people. The user may want to only view portions of the video stream where the person on the right side of the video frame is speaking. The user may point to the spatial position on the spatial seeking control 202 corresponding tot the position of the person on the right. The device (e.g. apparatus 100) may generate spatial seek points in the video stream corresponding to the points where the audio is coming from the direction of the person on the right and then provide for display of the spatial seek point information such as in seek information element 204.

In some example embodiments, the seek information element 204 may comprise a display of the timeline 206 of the video file, a display of the time points corresponding to the spatial seek points, 208a and 208b, as well as thumbnail images 210a and 210b from the video stream corresponding to the time points 208a and 208b. The display of seek point information may alternatively be provide in any other form, such as by providing a list of the generated seek points. A user may request to move to one of the generated spatial seek points, such as by clicking a time point 208a or 208b on the timeline 206 or a thumbnail image 210a or 210b. In embodiments where audio-only playback is being provided, thumbnail images may not be generated and the spatial seek information may be provided as a timeline of list format, for example.

FIG. 3 is a block diagram of components providing operations for spatial seeking that may be provided in some example embodiments. For example, components of apparatus 100 that may be used in spatial seeking in conjunction with the user interface 106 include a spatial seek operation interface 310, a playback interface 312 (e.g. display/speakers), an audio analysis module 306, and a database 308.

In example embodiments, providing spatial seeking uses analysis of the audio track included in the video and/or audio file being played back. The analysis of the audio track of the video and/or audio file may include determining spatial audio characteristics of the audio track, such as the direction of one or more sources of the sounds in the segments of the audio track. In such analysis, directions of audio sounds may be extracted from the audio stream and this spatial information may be used in part to generate one or more spatial seek points when the user requests spatial seeking. For example, normal stereo audio tracks allow simple left-right separation to be extracted. In other example embodiments, audio streams using a multichannel format (e.g. 5.1 audio) or audio streams that include other metadata may provide for improved spatial analysis and spatial seeking.

In some embodiments, the analysis of the audio track of the video and/or audio may be performed automatically by the processor upon capturing or storing of the video and/or audio file or based upon the type of video and/or audio file or the type of audio track. In some embodiments, the analysis of the audio track of the video and/or audio may be performed upon selection of the video and/or audio file for playback by a user or upon user input requesting spatial seek points for the video and/or audio file.

In some example embodiments, a media capturing device may comprise a microphone array which may allow for the incoming signals from the microphone array to be analyzed to detect directions of audio events. For example, audio data from all the channels of the microphone array may be recorded for later analysis or the audio data may be processed to include directional metadata in addition to the downmixed signal. For example, a binaural representation may be downmixed from the microphone array with some additional metadata.

As shown in FIG. 3, in some example embodiments a video stream 302 and an audio stream 304 may be received as inputs in a device, such as apparatus 100. For example, the streams may be demuxed from a container file format such as MP4, AVi, or the like. User interface 106 provides for playback of video stream 302 and audio stream 304, such as through playback interface 312, as well providing spatial seeking operations, such as through spatial seek operation interface 310. During playback of the video stream 302 and audio stream 304 a user may indicate a desire for spatial seeking to be performed, such as by indicating a direction or spatial location through spatial seek operation interface 310. Apparatus 100, such as using processor 102, may provide the audio stream 304 to audio analysis module 306. Audio analysis module 306 may be configured to analyze the incoming audio stream 304 and determine spatial cue points for the desired direction or spatial location and generate spatial seek point information to be provided to the user, such as through user interface 106. In some embodiments, audio analysis module 306 may be configured to analyze the incoming audio stream 304 and determine spatial audio characteristics of the audio stream for use in determining the spatial cue points. In some example embodiments, the generated spatial seek point information may be stored in database 308 and may then be used in providing spatial seeking operations, such as through user interface 106, if the same video and/or audio file is played back at a future time.

In some example embodiments, apparatus 100 may be configured to pre-process video and/or audio files stored on a device to provide at least a basic level of spatial seek information for each video and/or audio file and may cause the basic level of spatial seek information to be stored in database 308 for use in later playback of the video and/or audio file. In some example embodiments, apparatus 100 may be configured to pre-process video and/or audio files to determine spatial audio characteristics and generate spatial seek points automatically based upon the type of video and/or audio files or the type of audio stream.

An example of spatial seeking performed by some embodiments of the present invention may now be described in conjunction with the operations illustrated in FIG. 4. The operations illustrated in and described with respect to FIG. 4 may, for example, be performed by, with the assistance of, and/or under the control of one or more of the processor 102, memory 104, user interface 106, or communication interface 114.

In this regard, the apparatus 100 may include means, such as the processor 102, user interface 106, or the like, for receiving a request to play a video and/or audio file. See block 402 of FIG. 4. The apparatus 100 may include means, such as the processor 102, user interface 106, or the like, for providing for playback of the requested video and/or audio file. See block 404 of FIG. 4. For example, in one embodiment, user interface 106 may comprise a display and speakers for providing playback of video and/or audio files.

During playback of the selected video and/or audio file, a user may decide to request spatial seeking operations. The apparatus 100 may include means, such as the processor 102, user interface 106, or the like, for receiving a user request to generate spatial seek points. For example, in one embodiment, user interface 106 may present a spatial seek operation interface such as illustrated in FIG. 2, to a user. At block 406 of FIG. 4, apparatus 100 may receive a user request to provide spatial seek points corresponding to an indicated direction or spatial location. If the apparatus 100 does not receive a user request to provide spatial seek points, see block 406—No, the apparatus 100 continues to provide playback of the selected video and/or audio file. If the apparatus 100 receives a user request to provide spatial seek points, see block 406—Yes, operation continues to block 408 of FIG. 4.

As shown in block 408 of FIG. 4, the apparatus 100 may also include means, such as the processor 102, or the like, for analyzing the audio stream of the selected video and/or audio file and for generating spatial seek points corresponding to the indicated direction or spatial location. In some example embodiments, the apparatus 100 may also optionally include means, such as the processor 102, memory 104, or the like, for storing the generated spatial seek points for use in future playback of the selected video and/or audio file. See block 410 of FIG. 4.

As shown in block 412 of FIG. 4, the apparatus 100 may also include means, such as the processor 102, user interface 106, or the like, for providing indications of the generated spatial seek points to the user. For example, user interface 106 may provide a display of a timeline or list of the generated seek points and thumbnail images from the video stream corresponding to the indicated seek points, such as illustrated in FIG. 2.

In some example embodiments, spatial seek operations may vary according to continued input from a user. For example, upon receiving a request to generate spatial seek points for a indicated direction, apparatus 100 may first generate and provide the most obvious seek points corresponding to the indicated direction. In some embodiments, these initial seek points may have been generated from a pre-analysis and may be immediately available, without processing delay, to the user upon indication of the spatial seek direction. In such example embodiments, if a user continues to press, or repetitively presses, the spatial seek control in the same desired direction, the apparatus 100 may generate a second set of seek points including seek points containing a weaker indication of the spatiality from the selected direction or location. As such, example embodiments may provide several layers of processing to generate seek points, such as a first quick scan of a video and/or audio file for easily identified spatial seek points and providing further analysis and generation of additional seek points based on a user request. In example embodiments where seek points may be stored in a database, such as database 308, a first set of seek points may be retrieved from the database and the continued indication from the user for additional seek points may cause additional seek points to be retrieved from the database.

In some further example embodiments, analysis of the audio stream may be used to determine and categorize events within a video and/or audio file. For example, in a video file as described in conjunction with FIG. 2 above, one person in the interview may be speaking for a longer periods of time. Instead of first generating multiple seek points for such segments, a first analysis may provide a single seek point at the beginning of such speech, and if the user requests more seek points, additional seek points may be generated for the segments, for example, in 5 second intervals.

As such, in some example embodiments, the apparatus 100 may also optionally include means, such as the processor 102, user interface 106, or the like, for receiving a request for additional spatial seek points for the selected video and/or audio file corresponding to the indicated direction. See block 414 of FIG. 4. If the apparatus 100 receives a request for additional spatial seek points, operation may return to block 408 and apparatus 108 may perform generation of the additional seek points. See block 414—Yes.

As shown in block 416 of FIG. 4, the apparatus 100 may also include means, such as the processor 102, user interface 106, or the like, for receiving a selection of a particular spatial seek point from a user. For example, a user may indicate selection of a seek point by clicking on the indicated seek point on a timeline or list, or clicking on a displayed thumbnail image corresponding to the seek point such as illustrated in FIG. 2.

If the apparatus 100 receives a selection of a particular spatial seek point from a user, see block 416—Yes, operation moves to block 418. As shown in block 418 of FIG. 4, the apparatus 100 may also include means, such as the processor 102, user interface 106, or the like, for moving playback of the selected video and/or audio file to the indicated seek point and resuming playback from that point. If the apparatus 100 does not receive a selection of a particular spatial seek point from a user, see block 416—No, playback of the selected video and/or audio file continues.

FIG. 5 illustrates operations for an example of pre-processing for spatial seeking performed by some embodiments of the present invention. The operations illustrated in and described with respect to FIG. 5 may, for example, be performed by, with the assistance of, and/or under the control of one or more of the processor 102, memory 104, user interface 106, database 308, or communication interface 114.

In this regard, the apparatus 100 may include means, such as the processor 102, user interface 106, communications interface 108, or the like, for receiving video and/or audio files. See block 502 of FIG. 5.

As shown in block 504 of FIG. 5, the apparatus 100 may also include means, such as the processor 102, or the like, for analyzing the audio stream of the received video and/or audio file and for generating a first level of spatial seek points corresponding to the various directions or spatial locations represented in the video and/or audio file.

As shown in block 504 of FIG. 5, the apparatus 100 may also include means, such as the processor 102, memory 104, or the like, for storing the first level of generated spatial seek points for use in future playback of the video and/or audio file.

As described above, FIGS. 4 and 5 illustrate flowcharts of an apparatus, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 104 of an apparatus employing an embodiment of the present invention and executed by a processor 102 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as shown by the blocks with dashed outlines. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    providing for spatial audio playback of media data;
    generating, by a processor, one or more spatial seek points for the media data, wherein the spatial seek points correspond to a direction of a source of audio in the media data and indicate a location of the source of audio during a plurality of time segments within the media data;
    causing display of information corresponding to the one or more spatial seek points to be provided to a user interface, wherein the one or more spatial seek points are associated with the location of the source of audio;
    receiving a selection of one of the one or more spatial seek points;
    providing for spatial audio playback of the source of audio starting from a point of time of a segment corresponding to the selected at least one of the one or more spatial seek points; and
    causing display via the user interface of the selected at least one spatial seek point of the one or more spatial seek points to provide visual information about the spatial audio playback of the source of audio from the point of time during the time segment, the spatial audio playback comprises the direction of the source of audio during the time segment.

2. The method of claim 1 wherein generating the one or more spatial seek points for the media data is performed based on at least one of receiving a request for spatial seek points in the media data, automatically upon receiving the media data or upon starting playback of the media data, and a format of the media data.

3. The method of claim 2 wherein the request for spatial seek points in the media data comprises a requested location for spatial audio events in the media data.

4. The method of claim 1 further comprising causing storing of spatial seek point information for later use.

5. The method of claim 1 further comprising determining spatial audio characteristics of the media data for use in generating the one or more spatial seek points for the media data.

6. The method of claim 1 wherein causing display of information corresponding to the one or more spatial seek points comprises at least one of indicating start points of segments corresponding to spatial audio events from a requested location and causing display of a timeline indicating the spatial seek points and a thumbnail picture of a corresponding video segment for each of the spatial seek points on the timeline.

7. The method of claim 1 wherein the point of time is at a beginning point of time of the time segment.

8. The method of claim 1 further comprising causing display via the user interface of a further spatial seek point so as to provide playback of the media data from an associated time point of the further spatial seek point, wherein the associated time point of the further spatial seek point corresponds to a weaker indication of the direction of the source of audio.

9. An apparatus comprising at least one processor and at least one memory including computer program instructions, the at least one memory and the computer program instructions configured to, with the at least one processor, cause the apparatus at least to:
    provide for spatial audio playback of media data;
    generate one or more spatial seek points for the media data, wherein the one or more spatial seek points correspond to a direction of a source of audio in the media data and indicate a location of the source of audio during a plurality of time segments within the media data;
    cause display of information corresponding to at least one or more spatial seek points to be provided to a user interface, wherein the one or more spatial seek points are associated with the location of the source of audio;

receive a selection of at least one of the one or more spatial seek points;

provide for spatial audio playback of the source of audio starting from a point of time of a segment corresponding to the at least one of the one or more spatial seek points; and cause display via the user interface of the selected at least one spatial seek point of the one or more spatial seek points to provide visual information about the spatial audio playback of the source of audio from the point of time during the time segment, the spatial audio playback comprises the direction of the source of audio during the time segment.

10. The apparatus of claim 9 further configured to cause the apparatus to generate the one or more spatial seek points for the media data upon receiving a request for spatial seek points in the media data, automatically upon receiving the media data or upon starting playback of the media data, or based on a format of the media data.

11. The apparatus of claim 10 wherein the request for spatial seek points in the media data comprises a requested location for spatial audio events in the media data.

12. The apparatus of claim 9 further configured to cause the apparatus to store spatial seek point information for later use.

13. The apparatus of claim 9 further configured to cause the apparatus to determine spatial audio characteristics of the media data for use in generating the one or more spatial seek points for the media data.

14. The apparatus of claim 9 wherein causing display of information corresponding to the one or more spatial seek points comprises at least one of indicating start points of segments corresponding to spatial audio events from a requested location and causing display of a timeline indicating the spatial seek points and a thumbnail picture of a corresponding video segment for each of the spatial seek points on the timeline.

15. The apparatus of claim 9 wherein the point of time is at a beginning point of time of the time segment.

16. The apparatus of claim 9 further configured to cause the apparatus to cause display via the user interface of a further spatial seek point so as to provide playback of the media data from an associated time point of the further spatial seek point, wherein the associated time point of the further spatial seek point corresponds to a weaker indication of the direction of the source of audio.

17. A computer program product comprising at least one non-transitory computer-readable storage medium bearing computer program instructions embodied therein for use with a computer, the computer program instructions comprising program instructions configured to:

provide for spatial audio playback of media data;

generate one or more spatial seek points for the media data, wherein the spatial seek points correspond to a direction of a source of audio in the media data and indicate a location of the source of audio during a plurality of time segments within the media data;

cause display of information corresponding to at least one of the one or more spatial seek points to be provided to a user interface, wherein the one or more spatial seek points are associated with the location of the source of audio;

receive a selection of one of the one or more spatial seek points;

provide for spatial audio playback of the source of audio starting from a point of time of a segment corresponding to the at least one of the one or more spatial seek points; and cause display via the user interface of the selected at least one spatial seek point of the one or more spatial seek points to provide visual information about the spatial audio playback of the source of audio from the point of time during the time segment, the spatial audio playback comprises the direction of the source of audio during the time segment.

18. The computer program product of claim 17 further comprising program instructions configured to generate the one or more spatial seek points for the media data based on at least one of receiving a request for spatial seek points in the media data, automatically upon receiving the media data or upon starting playback of the media data, or a format of the media data.

19. The computer program product of claim 17 wherein the point of time is at a beginning point of time of the time segment.

20. The computer program product of claim 17 further comprising program instructions configured to cause display via the user interface of a further spatial seek point so as to provide playback of the media data from an associated time point of the further spatial seek point, wherein the associated time point of the further spatial seek point corresponds to a weaker indication of the direction of the source of audio.

* * * * *

UNITED STATES PATENT AND TRADEMARK OFFICE
CERTIFICATE OF CORRECTION

PATENT NO. : 9,779,093 B2
APPLICATION NO. : 13/719863
DATED : October 3, 2017
INVENTOR(S) : Jarvinen et al.

It is certified that error appears in the above-identified patent and that said Letters Patent is hereby corrected as shown below:

In the Claims

Column 13,
Line 63, "method" should read --method for spatial seeking in media data--.
Line 64, "media" should read --the media--.
Line 66, "spatial" should read --one or more spatial--.

Column 14,
Line 4, "to the" should read --to at least one of the--.
Line 8, "of one" should read --of at least one--.
Line 66, "one" should read --one of the one--.

Column 16,
Line 8, "the spatial" should read --the one or more spatial--.
Line 18, "of one" should read --of at least one--.

Signed and Sealed this
Nineteenth Day of June, 2018

Andrei Iancu
*Director of the United States Patent and Trademark Office*